UNITED STATES PATENT OFFICE.

HOWARD P. BURT AND GRINNELL BURT, OF PALERMO, CALIFORNIA.

PROCESS OF PACKING RIPE OLIVES.

1,238,708.　　　　　Specification of Letters Patent.　　Patented Aug. 28, 1917.

No Drawing.　　Application filed October 18, 1916.　Serial No. 126,436.

*To all whom it may concern:*

Be it known that we, HOWARD P. BURT and GRINNELL BURT, citizens of the United States, residing in Palermo, county of Butte, State of California, have invented certain new and useful Improvements in Processes of Packing Ripe Olives, whereof the following is a specification.

This invention relates to methods of preparing and packing ripe olives, for preservation and sale.

In carrying out the invention, we pickle the ripe olives in the usual manner, that is to say, by the use of solutions of caustic soda (lye) and salt, which extracts the bitterness, and flavors the olives. The olives are then sterilized by the use of a sterilizing liquid, by steam or otherwise.

When a liquid sterilizer is used, we drain off the liquid, or otherwise remove it and then seal the fruit in a partial vacuum in suitable containers. The containers may be of any suitable material, as glass or metal.

When the liquid is removed from the olives, either before or after sterilization, a reaction takes place, due to the exposure of the fruit to the air, which reaction is preserved or continued when the fruit is sealed in vacuum. By this reaction the quality and appearance of the fruit is greatly improved, the dark color of the fruit is intensified and better preserved, there is no liquid in the container to take up coloring matter from the olives and other desiderata are secured.

Having thus described our invention, and an embodiment of it in full clear and exact terms required by law, and knowing that it comprises novel, useful and valuable improvements in the art to which it pertains, we here state that we do not wish to be limited to the precise terms and steps and arrangements of the several parts, as herein set forth, as the same may be variously modified without departing from the spirit of the invention. What we claim and desire to secure by Letters Patent of the United States is the following, to wit:

Claims:

1. The method of treating ripe olives, which consists in pickling them, removing the liquid from them, sterilizing them, and sealing them in containers.

2. The method of treating ripe olives, which consists in pickling them in solution of caustic soda, removing the liquid from them, sterilizing them and then sealing them in containers *in vacuo*.

3. The method of treating ripe olives, which consists in pickling them, removing the liquid from them, sealing them in containers *in vacuo* and then sterilizing them.

In testimony that we claim the foregoing we have hereto set our hands, in the presence of witnesses, this 19th day of Sept., 1916.

HOWARD P. BURT.
　　　　　　　　GRINNELL BURT.

Witnesses:
　J. M. McGEE,
　H. LANGE.

Copies of this patent may be obtained for five cents each, by addressing the "Commissioner of Patents, Washington, D. C."